(12) United States Patent
Okajima (10) Patent No.: US 9,483,211 B2
(45) Date of Patent: Nov. 1, 2016

(54) STORAGE CONTROL APPARATUS, STORAGE CONTROL METHOD, AND COMPUTER-READABLE RECORDING MEDIUM HAVING STORED STORAGE CONTROL PROGRAM

(71) Applicant: FUJITSU LIMITED, Kawasaki-shi, Kanagawa (JP)

(72) Inventor: Masahiko Okajima, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 14/472,433

(22) Filed: Aug. 29, 2014

(65) Prior Publication Data

US 2015/0095592 A1  Apr. 2, 2015

(30) Foreign Application Priority Data

Sep. 27, 2013  (JP) ................................ 2013-202311

(51) Int. Cl.
*G06F 12/02* (2006.01)
*G06F 3/06* (2006.01)

(52) U.S. Cl.
CPC ............ *G06F 3/067* (2013.01); *G06F 3/0604* (2013.01); *G06F 3/0626* (2013.01); *G06F 3/0646* (2013.01); *G06F 3/0661* (2013.01); *G06F 3/0662* (2013.01)

(58) Field of Classification Search
CPC .... G06F 3/067; G06F 3/0626; G06F 3/0661; G06F 3/0662; G06F 3/0604; G06F 3/0646
See application file for complete search history.

(56) References Cited

U.S. PATENT DOCUMENTS

| 2002/0156984 | A1* | 10/2002 | Padovano | G06F 11/201 711/148 |
| 2002/0161982 | A1* | 10/2002 | Riedel | G06F 3/0608 711/170 |
| 2003/0204671 | A1* | 10/2003 | Matsunami | G06F 3/0604 711/112 |
| 2004/0139168 | A1* | 7/2004 | Tanaka | G06F 3/0614 709/213 |
| 2004/0233910 | A1* | 11/2004 | Chen | H04L 67/1097 370/395.5 |
| 2005/0172043 | A1* | 8/2005 | Nonaka | G06F 3/0614 710/5 |
| 2006/0218328 | A1 | 9/2006 | Vega et al. | |
| 2007/0168559 | A1 | 7/2007 | Tanaka et al. | |

(Continued)

FOREIGN PATENT DOCUMENTS

EP  1811387  7/2007
FR  2865817 A1  8/2005

(Continued)

OTHER PUBLICATIONS

Extended European Search Report dated Feb. 4, 2015 for corresponding European Application No. 14183708.8, 7 pages.

*Primary Examiner* — Hiep Nguyen
(74) *Attorney, Agent, or Firm* — Fujitsu Patent Center (57) ABSTRACT

A storage apparatus includes a processing unit that functions a SAN OS which performs SAN control and a NAS OS which performs NAS control to be operated on a virtualized OS, an inter-OS communication unit that transmits and receives data between the NAS OS and the SAN OS, a transmission controller that transmits a NAS input/output request received in the NAS OS to the SAN OS through the inter-OS communication unit, and a NAS request processing unit that processes the NAS input/output request received from the transmission controller in the SAN OS. With this configuration, the NAS and the SAN can be efficiently integrated in a storage apparatus.

12 Claims, 9 Drawing Sheets

(56) References Cited

U.S. PATENT DOCUMENTS

| | | |
|---|---|---|
| 2008/0005794 A1 | 1/2008 | Inoue et al. |
| 2008/0016311 A1 | 1/2008 | Harada |
| 2011/0087848 A1 | 4/2011 | Trent |
| 2012/0005691 A1* | 1/2012 | Wong ............... G06F 9/541 719/319 |
| 2012/0179901 A1* | 7/2012 | Idehara ............. G06F 9/545 713/100 |
| 2012/0260017 A1* | 10/2012 | Mine ................ G06F 9/544 710/308 |

FOREIGN PATENT DOCUMENTS

| | | |
|---|---|---|
| JP | 2004-220216 | 8/2004 |
| JP | 2008-535099 | 8/2008 |
| WO | 2006/022161 | 3/2006 |

* cited by examiner

STORAGE CONTROL APPARATUS, STORAGE CONTROL METHOD, AND COMPUTER-READABLE RECORDING MEDIUM HAVING STORED STORAGE CONTROL PROGRAM

CROSS-REFERENCE TO RELATED APPLICATION

This application is based upon and claims the benefit of priority of the prior Japanese Patent application No. 2013-202311, filed on Sep. 27, 2013, the entire contents of which are incorporated herein by reference.

FIELD

The embodiments discussed herein are directed to a storage control apparatus, a storage control method, and a storage control program.

BACKGROUND

As a network storage system, a network attached storage (NAS) and a storage area network (SAN) are known.

The NAS which is connected to the existing Internet (registered trademark) network is simple in management compared to the SAN, but degraded in performance and causes capacity insufficiency in many cases. On the other hand, the SAN generally operates at high speed compared to the NAS and can store a large amount of data, but it is expensive in price.

In order to improve the efficiency in data storage and the reduction in cost by combining advantages of the NAS and the SAN, a method of integrating the SAN and the NAS is known, and specifically the SAN and the NAS are integrated by employing a NAS gateway.

Patent Document 1: Japanese Laid-open Patent Publication No. 2004-220216

Patent Document 2: Japanese Laid-open Patent Publication No. 2008-535099

Patent Document 3: International Publication Pamphlet No. WO 2006/022161

However, the storage system in the related art is provided with a server machine for implementing a NAS gateway function in order to integrate the SAN and the NAS. Therefore, there is a problem in that a cost for configuring the system increases.

Further, the network storage system in which the NAS gateway is used to integrate the SAN and the NAS as described above, it is necessary to perform the setting of the SAN and the setting of the NAS separately. Therefore, there is also a problem in that a workload of operations by a manager increases.

SUMMARY

According to an aspect of the embodiments, a storage control apparatus includes a processing unit that functions a SAN operating system which performs SAN control and a NAS operating system (OS), which performs NAS control to be operated on a virtualized operating system, an inter-OS communication unit that transmits and receives data between the NAS operating system and the SAN operating system, a transmission controller that transmits a NAS input/output request received in the NAS operating system to the SAN operating system through the inter-OS communication unit, and a NAS request processing unit that processes the NAS input/output request received from the transmission controller in the SAN operating system.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, embodiments of a storage control apparatus, a storage control method, and a storage control program will be described with reference to the drawings. However, the following embodiments are given as merely exemplary embodiments, and it is not intended to exclude various modifications and various technical applications which are not specified in the embodiments. In other words, the embodiments can be implemented in various forms within a scope not departing from the spirit thereof. Further, there is no purpose of exclusively including only the components in the drawings, but other functions can be included.

Figure 1:
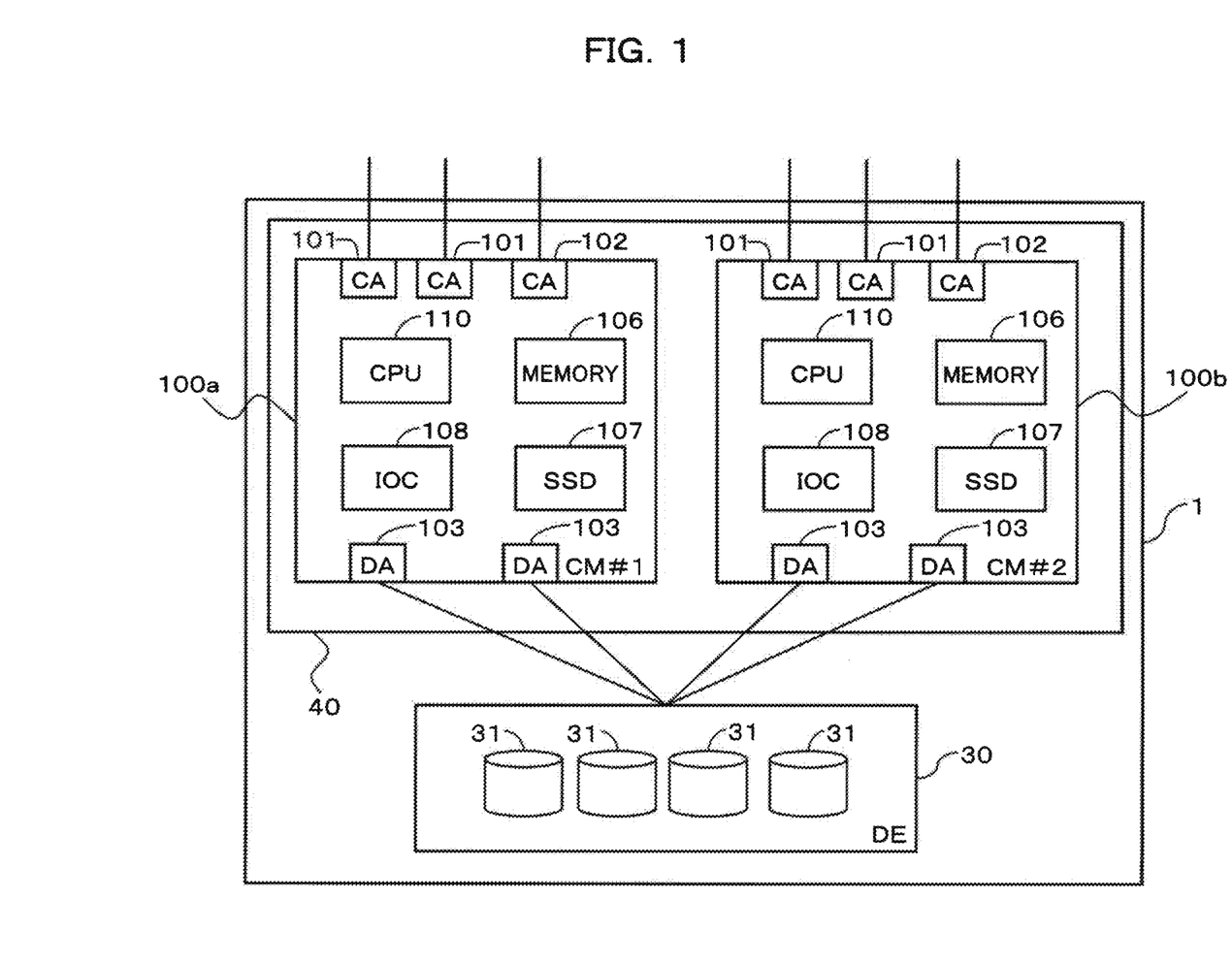
FIG. 1 is a diagram schematically illustrating a hardware configuration of a storage apparatus according to an embodiment.

FIG. 1 is a diagram schematically illustrating a hardware configuration of a storage apparatus 1 according to an embodiment.

The storage apparatus 1 virtualizes storage devices 31 which are stored in a drive enclosure (DE) 30 to set up a virtual storage environment. Then, the storage apparatus 1 provides a virtual volume to a host apparatus (not illustrated) which is an upper level device.

The storage apparatus 1 is communicably connected to one or more host apparatuses. The host apparatus and the storage apparatus 1 are connected through communication adapters (CAs) 101 and 102 which will be described below.

The host apparatus, for example, is an information processing apparatus which has a server function, and transmits/receives commands on a NAS and a SAN with respect to the storage apparatus 1. The host apparatus, for example, transmits a disk access command such as read/write in the NAS with respect to the storage apparatus 1 in order to read/write data from/to the volume provided by the storage apparatus 1.

Then, the storage apparatus 1 performs a process such as reading/writing of data on an actual storage corresponding to the volume according to an input/output request (for example, a read command and a write command) which is issued from the host apparatus to the volume. In addition, the input/output request from the host apparatus may be referred to as an I/O command or an I/O request.

As illustrated in FIG. 1, the storage apparatus 1 includes a plurality (two in the embodiment) of controller modules (CM) 100a and 100b and one or more (one in the example illustrated in FIG. 1) drive enclosures 30.

The drive enclosure 30 is mountable with one or more (four in the example illustrated in FIG. 1) storage devices (physical disks) 31, and provides the storage areas (actual volume, actual storage) of these storage devices 31 to the storage apparatus 1.

For example, the drive enclosure 30 includes a plural stages of slots (not illustrated), and the capacity of the actual volume can be changed at any time by inserting the storage devices 31 such as a hard disk drive (HDD) and a solid state drive (SSD) into these slots. Further, redundant arrays of inexpensive disks (RAID) may be formed using the plurality of storage devices 31.

The drive enclosure 30 is connected to device adapters (DAs) 103 and 103 of the CM 100a, and DAs 103 and 103 of the CM 100b. Therefore, any of the CMs 100a and 100b can access the drive enclosure 30 to perform the writing/reading of data. In other words, the respective CMs 100a and 100b are connected to the storage devices 31 of the drive enclosure 30, so that the access paths to the storage devices are redundantly formed.

A controller enclosure 40 includes one or more (two in the example illustrated in FIG. 1) CMs 100a and 100b.

The CMs 100a and 100b are controllers (storage control apparatuses) which control the operations in the storage apparatus 1, and perform various types of control such as access control to the storage device 31 of the drive enclosure 30 according to the I/O command transmitted from the host apparatus. Further, the CMs 100a and 100b have substantially the same configuration. Hereinafter, as a symbol for indicating the CM, when there is a need to specify one of a plurality of CMs, the symbols 100a and 100b will be used, and when any CM is indicated, the symbol 100 will be used. Further, the CM 100a may be represented by CM #1, and the CM 100b by CM #2.

Further, in the drawings, the same symbols as those described above indicate the identical or similar portions, and thus the descriptions thereof will not be repeated.

The CMs 100a and 100b are configured in pair, and the CM 100a performs various types of control under normal conditions as a primary CM. However, when the primary CM 100a fails in its operation, the secondary CM 100b takes over the operation from the primary CM 100a.

The CMs 100a and 100b each are connected to the host apparatus through the CAs 101 and 102. Then, the CMs 100a and 100b receive commands such as read/write which are transmitted from the host apparatus, and performs control on the storage device 31 through the DA 103 or the like. Further, the CMs 100a and 100b are connected to each other through an interface (not illustrated) such as PCI Express.

As illustrated in FIG. 1, the CM 100 includes the CAs 101 and 102 and a plurality (two in the example illustrated in FIG. 1) of the DAs 103 and 103, and further includes a central processing unit (CPU) 110, a memory 106, an SSD 107, and an IOC 108.

The CAs 101 and 102 receive data transmitted from the host apparatus and the like, or transmits data out of the CM 100 to the host apparatus and the like. In other words, the CAs 101 and 102 controls data input/output (I/O) with respect to an external apparatus such as the host apparatus.

The CA 101 is a network adapter which is communicably connected to the host apparatus through the NAS; for example, there is a local area network (LAN) interface and the like.

The CM 100 is connected to the host apparatus and the like by the NAS through a communication line (not illustrated) connected to the CA 101, and performs an I/O command reception and a data transmission/reception. In the example illustrated in FIG. 1, each of the CMs 100a and 100b includes two CAs 101 and 101.

The CA 102 is a network adaptor which is communicably connected to the host apparatus through the SAN; for example, there is an iSCSI interface and a fibre channel (FC) interface.

The CMs 100 are connected to the host apparatus and the like by the SAN through the communication line (not illustrated) connected to the CA 102, and perform the I/O command reception and the data transmission/reception. In the example illustrated in FIG. 1, each of the CMs 100a and 100b includes one CA 102.

The DA 103 is an interface which is communicably connected to the drive enclosure 30, the storage device 31 and the like. The DA 103 is connected to the storage devices 31 of the drive enclosure 30, and each CM 100 performs the access control to the storage devices 31 based on the I/O command received from the host apparatus.

The CM 100 performs data write/read on the storage device 31 through the DA 103. Further, in the example illustrated in FIG. 1, each of the CMs 100a and 100b includes two DAs 103 and 103. Then, in each of the CMs 100a and 100b, each DA 103 is connected to the drive enclosure 30.

With this configuration, any one of the CMs 100a and 100b can perform data write/read on the storage device 31 of the drive enclosure 30.

The SSD 107 is a storage device which stores a program executed by the CPU 110 and various types of data.

The memory 106 is a storage device which temporarily stores various types of data and a program, and includes a memory area and a cache area which are not illustrated. The cache area temporarily stores data received from the host apparatus and data to be transmitted to the host apparatus. The memory area is used to temporarily store and develop the data and the program when the CPU 110 executes the program.

The input output controller (IOC) 108 is a control device which controls data transmission in the CM 100, and for example realizes DMA (Direct Memory Access) transfer in which the data stored in the memory 106 is transferred without passing through the CPU 110.

The CPU 110 is a processing device which performs various types of control and calculations, and for example there is a multi-core processor (multi-CPU). The CPU 110 executes the OS and the program stored in the SSD 107 and the like, thereby realizing various functions.

The CPU 110 executes a hypervisor 200 which is a virtualization OS, and executes a plurality of virtual machines (VMs) on the hypervisor, thereby causing a plurality of OSs to be executed. Hereinafter, an OS executed on the hypervisor 200 may be referred to as a guest OS or a GOS.

A plurality of guest OSs can share hardware resources such as the CPU 110, the memory 106, and the SSD 107.

In addition, a plurality of CPUs 110 may be provided and the hypervisor 200 may be performed on the plurality of CPUs 110.

Figure 2:
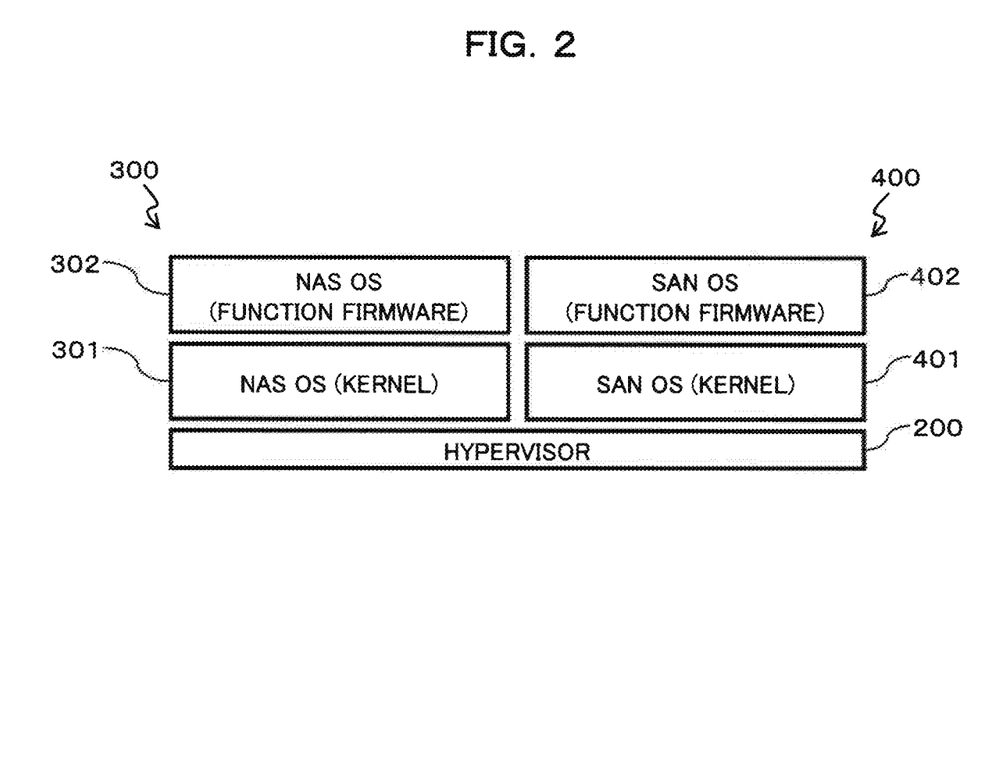
FIG. 2 is a diagram schematically illustrating a plurality of OSs on a hypervisor in the storage apparatus according to the embodiment.

FIG. 2 is a diagram schematically illustrating a plurality of OSs on the hypervisor 200 in the storage apparatus 1 according to the embodiment.

In the embodiment, as illustrated in FIG. 2, a SAN OS 400 and a NAS OS 300 are executed on the hypervisor 200.

The SAN OS 400 is an OS for performing SAN control, and includes a kernel 401 and a function firmware 402. Various types of existing OSs can be used as the SAN OS 400, but VxWorks (registered trademark) made by Wind River will be exemplified in the embodiment.

The NAS OS 300 is an OS for performing NAS control, and includes a kernel 301 and a function firmware 302. Various types of existing OSs can be used as the NAS OS 300, but Linux (registered trademark) will be exemplified in the embodiment.

Then, the CPU 110 functions as the hypervisor 200, the SAN OS 400, and the NAS OS 300 by executing a storage control program.

In addition, a program (storage control program) for realizing the functions as the hypervisor 200, the SAN OS 400, and the NAS OS 300, for example, is provided in types of being recorded in a computer-readable recording medium such as a flexible disk, a CD (such as a CD-ROM, a CD-R, and a CD-RW), a DVD (such as a DVD-ROM, a DVD-RAM, a DVD-R, a DVD+R, a DVD-RW, a DVD+RW, and an HD DVD), a Blu-ray disk, a magnetic disk, an optical disk, a magneto-optical disk, and the like. In this case, the computer reads the program from the recording medium, and transfers and stores the program into an inner storage unit or an external storage unit for use. While being stored in a storage apparatus (recording medium) such as the magnetic disk, the optical disk, and the magneto-optical disk, the program may be provided to a processor 10 from the storage apparatus through a communication path. Further, the program may be recorded in a storage device (recording medium), for example, a magnet disk, an optical disk, a magneto-optical disk, and the like, and provided to the computer from the storage device through a communication path.

When the functions as the hypervisor 200, the SAN OS 400, and the NAS OS 300 are realized, the program stored in an internal storage device (the memory 106 and the SSD 107 in the embodiment) is executed by a microprocessor (the CPU 110 in the embodiment) of the computer. At this time, the program stored in the recording medium may be read by the computer for execution.

Figure 3:
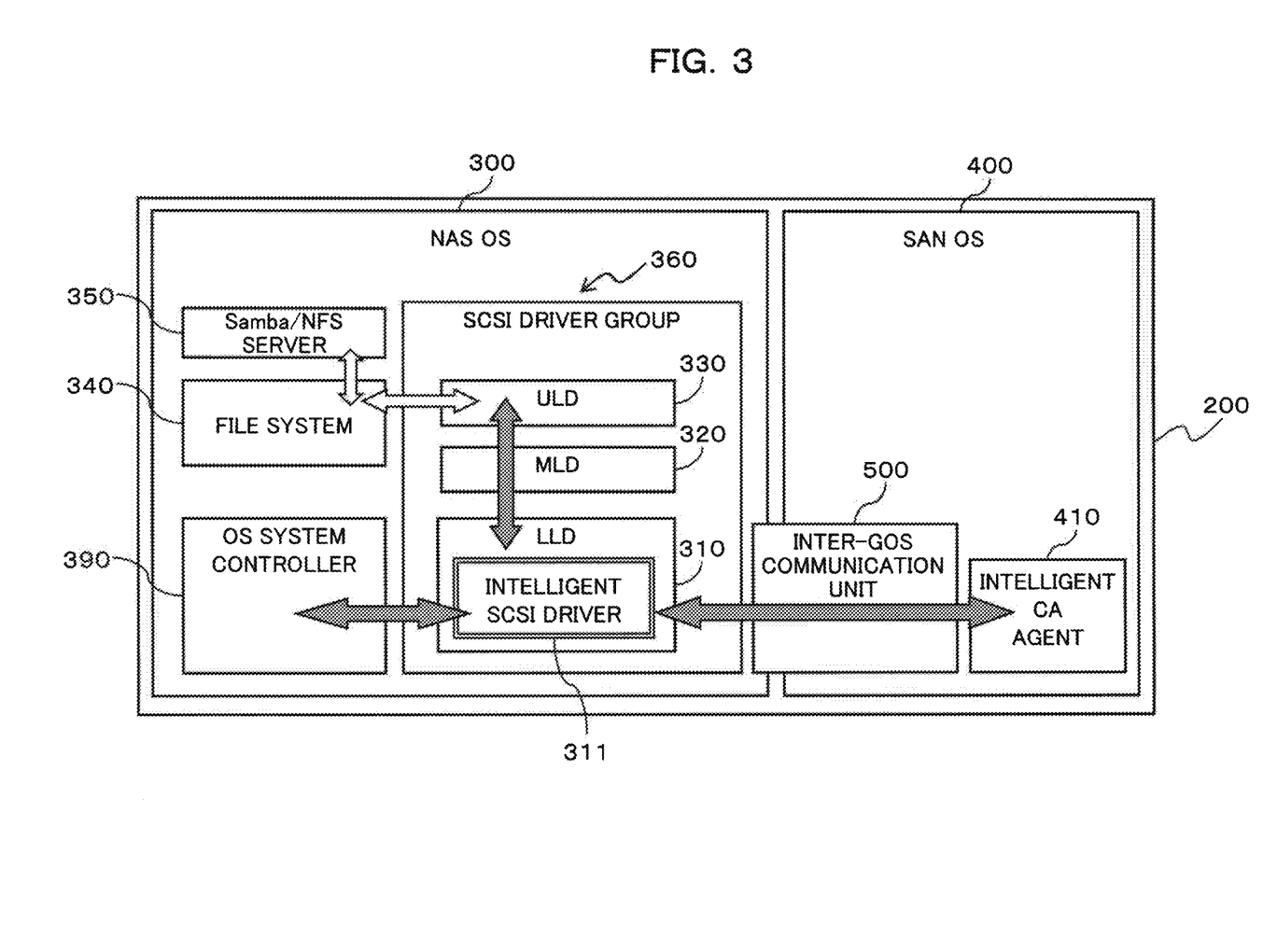
FIG. 3 is a diagram schematically illustrating a functional configuration of a NAS OS and a SAN OS on the hypervisor in the storage apparatus according to the embodiment.

FIG. 3 is a diagram schematically illustrating a functional configuration of the NAS OS 300 and the SAN OS 400 on the hypervisor 200 in the storage apparatus 1 according to the embodiment.

As illustrated in FIG. 3, the NAS OS 300 includes Samba/NFS server software 350, a file system 340, an OS system controller 390, and an SCSI driver group 360.

On the other hand, the SAN OS 400 includes an intelligent CA agent 410. Further, an inter-GOS communication unit 500 is provided to connect the NAS OS 300 and the SAN OS 400.

The Samba/NFS server software 350 is a file system-based application, which uses Samba or NFS to receive the I/O request of the NAS received from the host apparatus and transfers the request to the file system 340.

The file system 340, for example, is a virtual file system (VFS) or a file system such as ext3, which converts the I/O request received from the Samba/NFS server software 350 into an API of every relative local file system and transfers the API to the SCSI driver group 360.

The OS system controller 390 performs various types of normal control as the NAS OS, and for example issues an event request such as additional request of the device to the SCSI driver group 360 (an LLD 310).

The SCSI driver group 360 includes a plurality of drivers for controlling SCSI devices.

As illustrated in FIG. 3, the SCSI driver group 360 has a layered architecture which is configured of 3 layers such as an upper level driver (ULD; upper level layer) 330, a middle level driver (MLD; middle level layer) 320, and a lower level driver (LLD; lower level layer) 310.

The ULD 330 includes a highest level interface for types of kernels and primary devices of the SCSI.

In the ULD 330, four types of drivers such as an SD, an SR, an ST, and an SG are prepared, and these drivers are differently used depending on the types of SCSI devices. Herein, the SD is used at the time of access to a HDD, and has a block type. The SR is used at the time of access to a CD-ROM, and has a block type. The ST is used at the time of access to a tape device, and has a block type. The SG is a pseudo host adapter which is used without a host bus adapter (hardware), and has a character type.

The MLD 320 provides an SCSI driver API (Application Programming Interface, library) for the ULD 330 and the LLD 310. The SCSI driver reads the MLD 320 to perform control.

Figure 5:
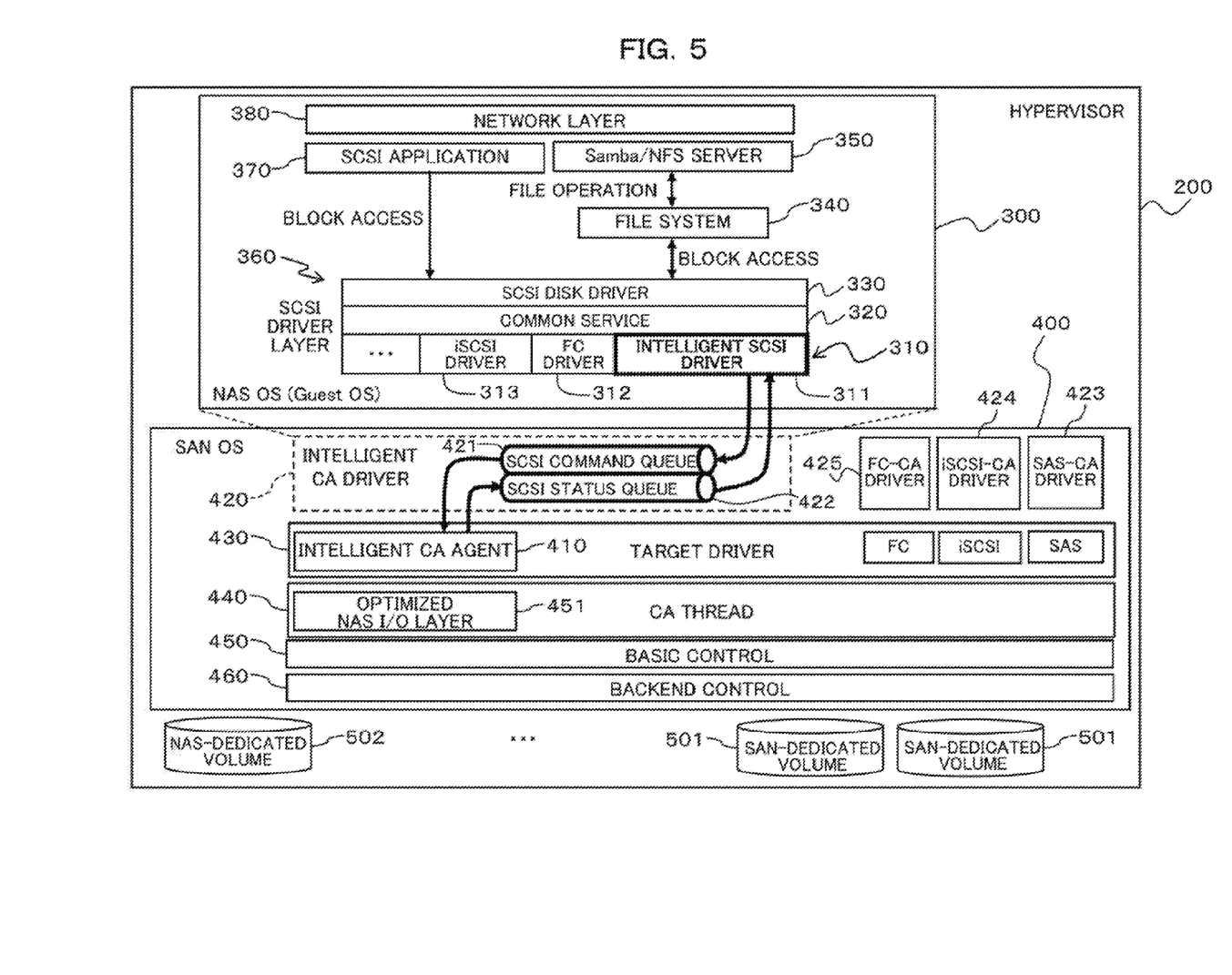
FIG. 5 is a diagram illustrating a detailed functional configuration of the NAS OS and the SAN OS on the hypervisor of the storage apparatus according to the embodiment.

The LLD 310 includes an actual driver corresponding to a physical interface which is applicable to the SCSI, and corresponds to the host bus adapter. The LLD 310 is a driver layer which controls a hardware interface, and the driver to be used is unique for every device. For example, as illustrated in FIG. 5, the LLD 310 includes an iSCSI driver 313 and an FC driver 312. Furthermore, in the storage apparatus 1, the LLD 310 includes an intelligent SCSI driver 311. In addition, an existing Linux driver may be used for the ULD 330 and the MLD 320.

As illustrated in FIG. 3, in the NAS OS 300, the I/O request from the host apparatus reaches the intelligent SCSI driver 311 of the LLD 310 through the Samba/NFS server software 350, the file system 340, the ULD 330, and the MLD 320.

The intelligent SCSI driver 311 receives the I/O request from the file system 340, and transmits the I/O request to the intelligent CA agent 410 in the SAN OS 400 through the inter-GOS communication unit 500 to be described below. In addition, the I/O request receives the request in a format of an SCSI command in the intelligent SCSI driver 311.

Further, the intelligent SCSI driver 311 receives a response (result) to the transmitted SCSI command from the intelligent CA agent 410, and informs the ULD 330 of the SCSI driver layer 360 about the received result.

When receiving the I/O request of the NAS from the host apparatus and the like, the intelligent SCSI driver 311 suppresses a direct access to a SAN-dedicated volume 501 (see FIG. 5) and transmits the I/O request of the NAS to the SAN OS 400 by inter-guest communication through the inter-GOS communication unit 500 to be described.

Furthermore, the intelligent SCSI driver 311 processes the event request for the device which is received from the OS system controller 390 of the NAS OS 300. For example, in a case where the event request is a request for adding a device, the intelligent SCSI driver 311 receives the addition request and adds (defines) a device file in the folder "/dev".

The inter-GOS communication unit 500 transmits or receives data between the guest OSs. In the storage apparatus 1, the data is transmitted or received between the NAS OS 300 and the SAN OS 400. Specifically, the I/O request (SCSI command) received in the NAS OS 300 is transferred from the intelligent SCSI driver 311 to the intelligent CA agent 410 of the SAN OS 400.

Further, the inter-GOS communication driver 510 transfers a response (result) to the I/O request from the intelligent CA agent 410 of the SAN OS 400 to the intelligent SCSI driver 311 of the NAS OS 300.

Figure 4:
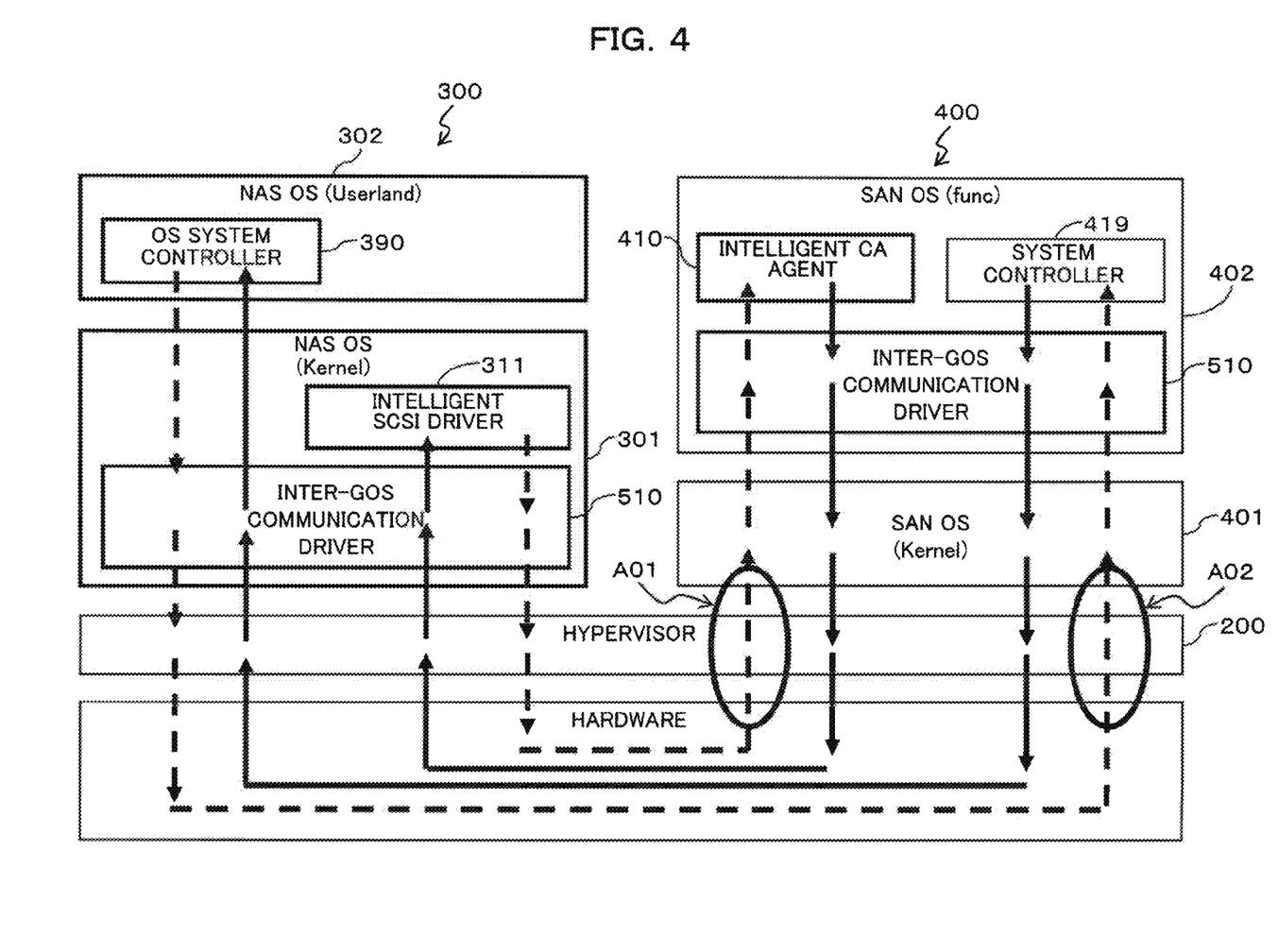
FIG. 4 is a diagram for describing inter-guest OS communication in the storage apparatus according to the embodiment.

FIG. 4 is a diagram for describing inter-GOS communication in the storage apparatus 1 according to the embodiment.

The inter-GOS communication unit 500 controls communication between the guest OSs through the inter-GOS communication driver 510 which is provided in each of the SAN OS 400 and the NAS OS 300.

Further, the inter-guest OS communication uses a shared memory 520 (see FIG. 9) shared between the NAS OS 300 and the SAN OS 400 and an interrupt of an inter-processor interrupt (IPI) scheme. The IPI controls an interrupt between the guest OSs through the hypervisor 200.

In other words, the inter-GOS communication driver 510 of the guest OS on the data transmission side writes information (data) indicating a request to transmit data to a predetermined area (for example, a control area for transferring a request) of the shared memory 520. Then, an interrupt is informed to the inter-GOS communication driver 510 of the guest OS at the transmission destination using the IPI function through the hypervisor 200. The inter-GOS communication driver 510 which receives the interrupt reads the area in the shared memory 520 to make preparation for the reception of transmission data. Therefore, the data transmission/reception (communication) between the guest OSs is completed.

Further, in actual data transmission, data transmission between the cache area and each guest OS area in the shared memory 520 is realized by the DMA transfer function of the IOC 108 described above. REQUEST/RESPONSE as exchange of control information for transmitting and receiving the data are realized using the shared memory 520 and the interrupt of the IPI scheme.

In the example illustrated in FIG. 4, a thick broken line represents an IPI notification from the NAS OS 300 to the SAN OS 400, and a thick solid line represents the IPI notification from the SAN OS 400 to the NAS OS 300.

In the example illustrated in FIG. 4, in the NAS OS 300, the OS system controller 390 and the intelligent SCSI driver 311 instruct the inter-GOS communication driver 510 to transmit data, and receive a response from the inter-GOS communication driver 510. On the other hand, in the SAN OS 400, an intelligent CA agent 410 and a system controller 419 instruct the inter-GOS communication driver 510 to transmit data, and receive a response from the inter-GOS communication driver 510.

Further, when the data is transmitted from the SAN OS 400 to the NAS OS 300, the hypervisor 200 handles an interrupt by the IPI, and informs the NAS OS 300. However, when the data is transmitted from the NAS OS 300 to the SAN OS 400, a direct interruption scheme is used to directly inform the SAN OS 400 without passing through the hypervisor 200 as denoted by arrows A01 and A02 in FIG. 4. The direct interrupt is an interrupt notification between the guest OSs without passing through the hypervisor 200.

With this configuration, it is possible to speed up the data transmission (inter-guest communication) from the NAS OS 300 to the SAN OS 400.

FIG. 5 is a diagram illustrating a detailed functional configuration of the NAS OS 300 and the SAN OS 400 on the hypervisor 200 of the storage apparatus 1 according to the embodiment.

As illustrated in FIG. 5, the NAS OS 300 includes the SCSI driver layer 360, the file system 340, the Samba/NFS server software 350, a SCSI application 370, and a network layer 380.

The network layer 380 controls communication in a network layer, for example, receives the I/O request of the NAS from the host apparatus.

The SCSI driver layer 360 is a driver group for controlling the SCSI devices, and corresponds to the SCSI driver group 360 illustrated in FIG. 3.

In the NAS OS 300, an I/O control request is issued to the SCSI driver layer 360 through the file system 340.

In the SCSI driver layer 360, an SCSI disk driver corresponds to the ULD 330 illustrated in FIG. 3, and a common service corresponds to the MLD 320.

Further, the SCSI driver layer 360 includes the iSCSI driver 313 and the FC driver 312 which correspond to the above-mentioned LLD 310. The functions of the respective components as the NAS OS 300 are well known in Linux and the like for example, and thus the detailed descriptions thereof will not be made.

Then, in the storage apparatus 1, the LLD 310 of the SCSI driver layer 360 includes the above-mentioned intelligent SCSI driver 311.

As illustrated in FIG. 5, the SAN OS 400 includes an intelligent CA driver 420, a target driver 430, a CA thread 440, a basic control 450, a backend control 460, an FC-CA driver 425, an iSCSI-CA driver 424, and a SAS-CA driver 423.

In addition, among these components, the functions as the target driver 430, the CA thread 440, the basic control 450, the backend control 460, the FC-CA driver 425, the iSCSI-CA driver 424, and the SAS-CA driver 423 are well known in the SAN OS 400 such as VxWorks, and thus the descriptions thereof will not be made.

The intelligent CA driver 420 is a virtual driver layer of the NAS which is added to a channel adapter driver layer of the SAN control in the SAN OS 400. The intelligent CA driver 420 performs the I/O request and a response transmission/reception of the NAS with respect to the NAS OS 300. The intelligent CA driver 420 includes an SCSI command queue 421 and an SCSI status queue 422.

For example, the I/O command received from the NAS OS 300 is stored in the SCSI command queue 421, and status information and the like as a response to the NAS OS 300 is stored in the SCSI status queue 422.

The target driver 430 includes the intelligent CA agent 410. The intelligent CA agent 410 is a NAS-dedicated function which is added to the target driver 430, and is a block which controls the I/O request received from the NAS OS 300 through the inter-guest OSs communication. The intelligent CA agent 410 may be called a NAS control block 441b. The function of the intelligent CA agent 410 (the NAS control block 441b) will be described below.

The CA thread 440 includes an optimized NAS I/O layer 451. The optimized NAS I/O layer 451 is used for processing the I/O request from the NAS OS 300, and obtained by customizing the CA thread (including the CA driver) of the SAN. The optimized NAS I/O layer 451 may be called the CA control block 441*a*. The function of the optimized NAS I/O layer 451 (the CA control block 441*a*) will be described below.

Furthermore, one or more SAN-dedicated volumes 501 and NAS-dedicated volumes 502 are provided on the hypervisor 200. The SAN-dedicated volumes 501 are storage areas in which the I/O request by the SAN is performed, and the NAS-dedicated volumes 502 are storage areas in which the I/O request by the NAS is performed. In other words, the SAN-dedicated volumes 501 and the NAS-dedicated volumes 502 are guest OS-dedicated volumes.

The SAN-dedicated volumes 501 and the NAS-dedicated volumes 502, for example, are set and managed by a management apparatus (not illustrated), and a management screen and the like thereof are displayed on a display of the management apparatus.

Figure 6:
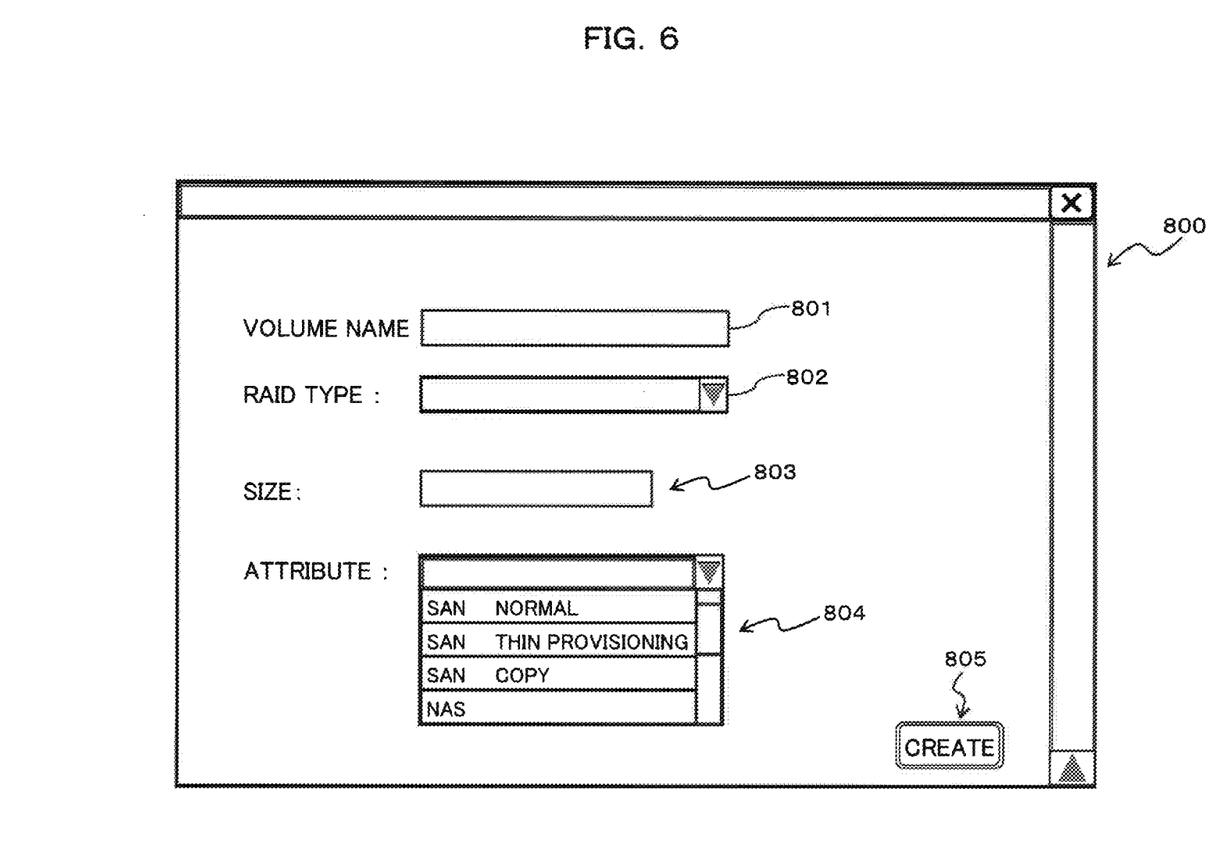
FIG. 6 is a diagram illustrating a volume creation screen in the storage apparatus according to the embodiment.

FIG. 6 is a diagram illustrating a volume creation screen 800 in the storage apparatus 1 according to the embodiment.

In the storage apparatus 1, various types of management screens are displayed on the display of the management apparatus. For example, the volume creation screen 800 as illustrated in FIG. 6 is displayed when a volume is created. A manager operates an input device such as a mouse and a keyboard (not illustrated) to input various types of information in the volume creation screen 800, so that the SAN-dedicated volume 501 and the NAS-dedicated volume 502 are created.

The management screen displayed on the display of the management apparatus, for example, may be created and displayed by the management apparatus, or the CPU 110 and the like of the primary CM 100 may perform these processes.

In the example illustrated in FIG. 6, the volume creation screen 800 includes input areas 801 to 804. For example, an arbitrary volume name of a volume to be created can be input in the input area 801. An arbitrary RAID type of the volume to be created can be input in the input area 802. In the example illustrated in FIG. 6, any one of RAID 1 to RAID 6 can be selected in a pull-down menu.

An arbitrary size of the volume to be created can be input in the input area 803. Further, an arbitrary attribute of the volume to be created can be input in the input area 804. For example, in the example illustrated in FIG. 6, any one of a SAN volume and a NAS volume can be selected as an attribute, and any one of "Normal", "Thin provisioning", and "Copy" can be further selected as the SAN volume.

For example, in a case where any one of "SAN Normal", "SAN Thin provisioning", "SAN Copy" is selected as the volume attribute, the SAN volume can be created, and when "NAS" is selected, the NAS volume can be created.

When a create button 805 is selected after the input areas 801 to 804 are input with each piece of information, the I/O request instructing to create the volume is transmitted to the SAN OS 400 for example.

Further, the storage apparatus 1 can selectively create the SAN volume and the NAS volume in one volume creation screen 800. In other words, the SAN volume and the NAS volume can be managed and operated through one management screen, and the convenience increases.

Figure 7:
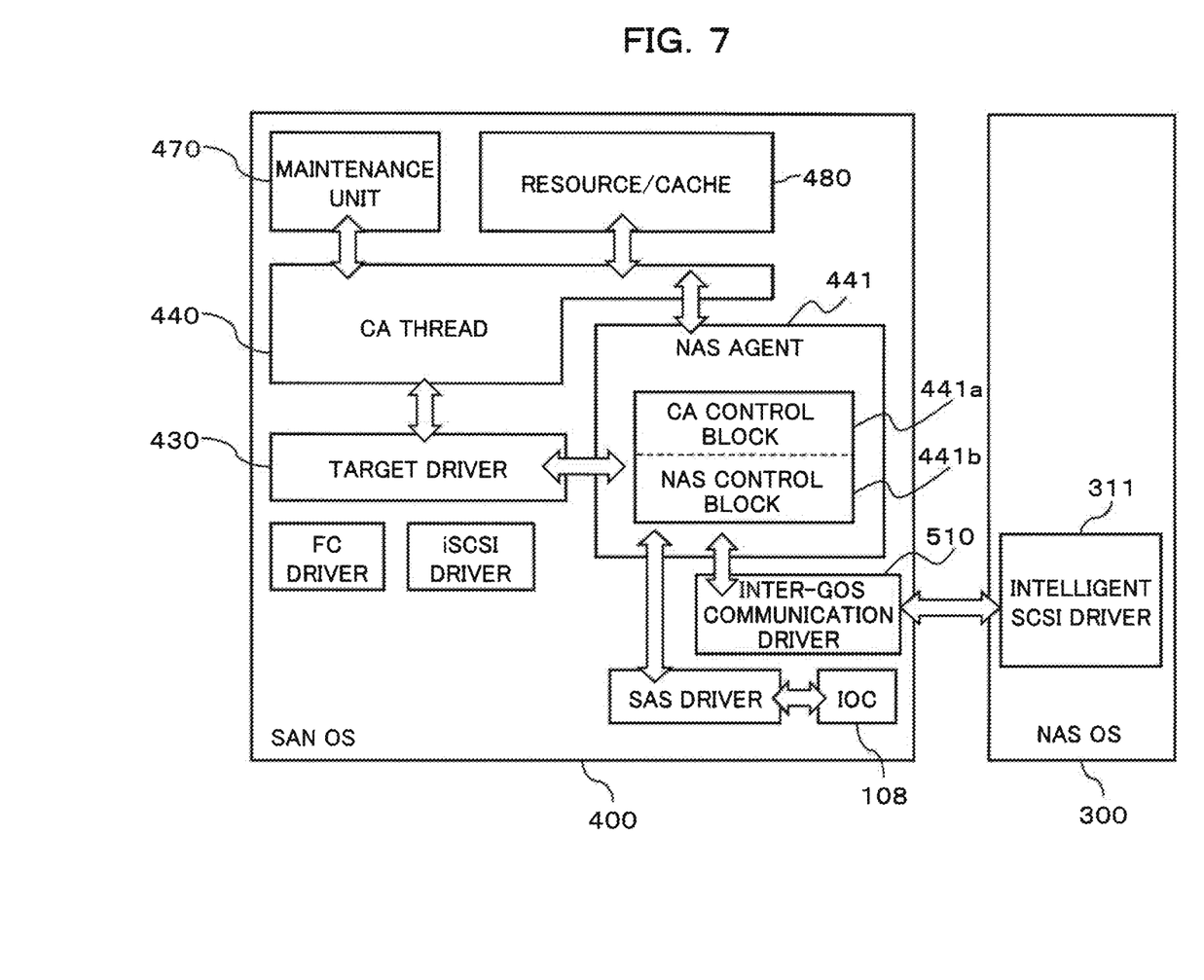
FIG. 7 is a diagram schematically illustrating a functional configuration of the SAN OS in the storage apparatus according to the embodiment.

FIG. 7 is a diagram schematically illustrating a functional configuration of the SAN OS 400 in the storage apparatus 1 according to the embodiment.

The SAN OS 400 includes a NAS agent 441 which processes the I/O request from the NAS OS 300.

The NAS agent 441 processes a NAS input/output request which is received from the intelligent SCSI driver 311.

The NAS agent 441 includes the NAS control block 441*b* which controls the I/O request from the NAS OS 300, and the CA control block 441*a* which processes the I/O request.

The intelligent CA agent 410 illustrated in FIG. 5 functions as the NAS control block 441*b*, or the optimized NAS I/O layer 451 illustrated in FIG. 5 functions as the CA control block 441*a*. In other words, the intelligent CA agent 410 and the optimized NAS I/O layer 451 function as the NAS agent 441.

The NAS control block 441*b* controls the I/O request which is received from the NAS OS 300 through the inter-GOS communication unit 500.

For example, the NAS control block 441*b* has a function of logging in to a virtual host (dummy host) so as to process the request from the NAS OS 300 in the SAN OS 400, and informs the CA control block 441*a*.

Further, the NAS control block 441*b* analyzes and checks the SCSI command from the NAS OS 300 and informs the CA control block 441*a*.

As the SCSI command which is supportable in the NAS control block 441*b*, the following commands are exemplified.

READ6(10), WRITE6(10), READ CAPACITY(16), SYNCHRONIZE CACHE, TEST UNIT READY, INQUIRY(Standard, Page 00, 80, 83, 86, 8F, B0, B2, F0, F1, F2) and MODE SENSE (page 00, 01, 02, 03, 04, 07, 08, 0A, 1C).

In addition, for example, the number written in the parenthesis "( )" in these commands shows various types of parameters such as a bit number and a page number, and various modifications can be made.

Further, the NAS control block 441*b* sends a request to the IOC 108 for the data transmission and data integrity field (DIF) control between the cache area and the NAS OS area in the shared memory 520 through a serial attached SCSI (SAS) driver for example according to a transmission request content from the CA control block 441*a* as described below.

The CA control block 441*a* processes the I/O request which is received from the NAS OS 300 through the inter-GOS communication unit 500. The CA control block 441*a* has the following functions.

In other words, an NIC (Network Interface Card) mounting port area in a port management area is released to the NAS control block 441*b*, and a command management such as queue management and block control is performed.

Further, the CA control block 441*a* informs the basic control 450 (see FIG. 5) of a command and an event which are created by the NAS control block 441*b*. Furthermore, when the data transmission is requested from the basic control 450, the NAS control block 441*b* is called to perform a process according to the processing result. In other words, an abnormal sense creation, a transmission request and the like are performed.

In addition, a resource/cache 480 in FIG. 7 corresponds to the basic control 450 in FIG. 5. Further, a maintenance unit 470 is a maintenance controller which performs control of a maintenance system in the storage apparatus 1.

Figure 8:
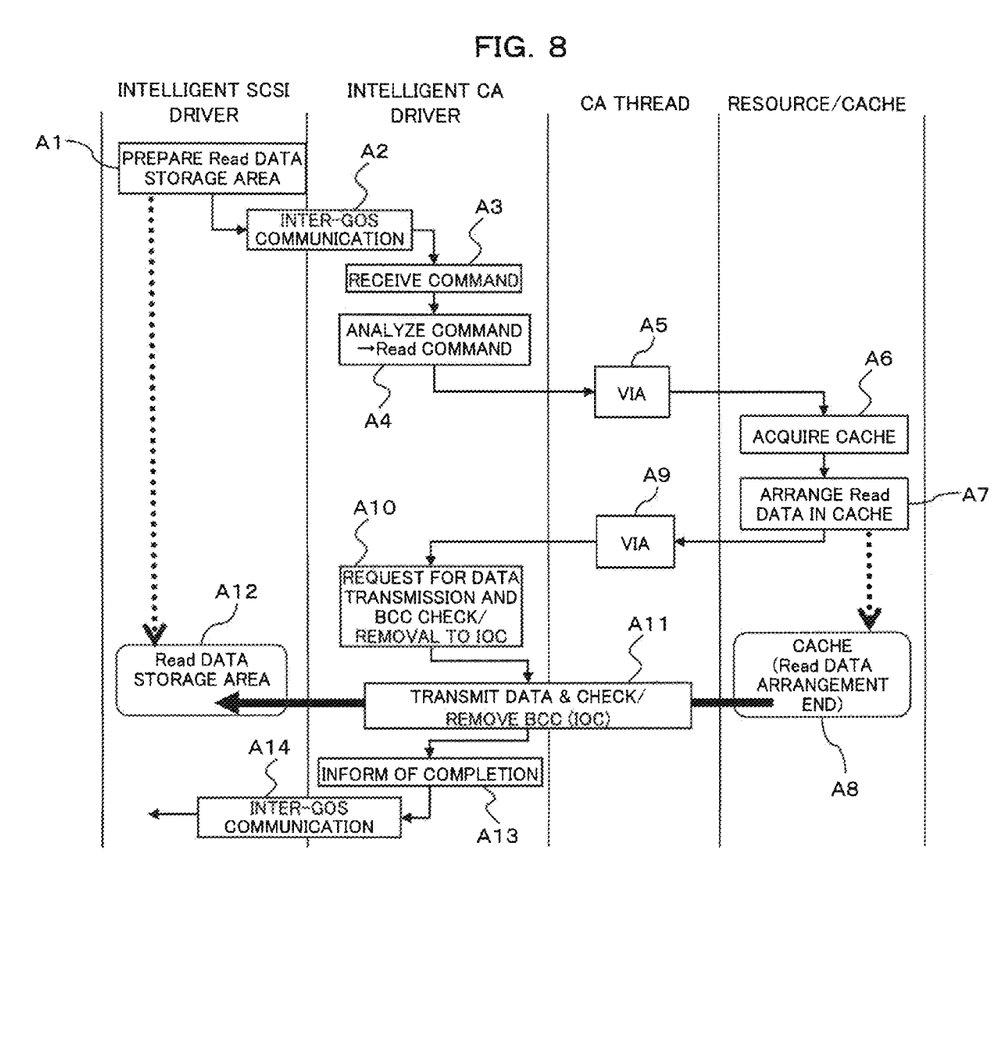
FIG. 8 is a sequence diagram for describing an exemplary process in the storage apparatus according to the embodiment.

An exemplary process in the storage apparatus 1 according to the embodiment as configured above will be described according to a flowchart illustrated in FIG. 8. In addition, in FIG. 8, a read command of the NAS is exemplified.

When the read request of the NAS is performed, the intelligent SCSI driver 311 in the NAS OS 300 prepares a read data storage area in the NAS area of the shared memory 520 in Step A1.

In Step A2, the read command is informed from the intelligent SCSI driver 311 of the NAS OS 300 to the intelligent CA driver 420 of the SAN OS 400 through the inter-GOS communication unit 500 (inter-GOS communication). In addition, since the inter-GOS communication is performed in a direct interrupt scheme without passing through the hypervisor 200, it is possible to reduce time necessary for the communication.

In Step A3, the intelligent CA driver 420 receives the read command. In this way, the inter-GOS communication is performed between the NAS OS 300 and the SAN OS 400.

In Step A4, the intelligent CA driver 420 analyzes the received command and determines that the command is the read command. The read command is passed through the CA thread 440 (Step A5), and in Step A6, a cache area is acquired by the resource/cache 480.

In Step A7, the resource/cache 480 arranges read data in the acquired cache area, and the cache area comes to be a state where the read data is ended in arrangement (Step A8). The fact that the read data is arranged in the cache area is informed through the CA thread (Step A9) to the intelligent CA driver 420.

In Step A10, the intelligent CA driver 420 makes a request to the IOC 108 for the data transmission, a block check character (BCC) check, and the added BCC removal. When the IOC 108 performs these processes, the read data in the cache area is stored in the read data storage area secured by the intelligent SCSI driver 311 in Step A1 (Step A12).

Further, the IOC 108 informs the intelligent CA driver 420 of the completion (Step A13), and the intelligent CA driver 420 informs the intelligent SCSI driver 311 of the completion through the inter-GOS communication unit 500 (inter-GOS communication) in Step A14. At this time, the inter-GOS communication is performed between the SAN OS 400 and the NAS OS 300.

Next, a creating process of the NAS-dedicated volume 502 (see FIG. 5) in the storage apparatus 1 according to the embodiment will be described according to a flowchart illustrated in FIG. 9 (Steps B1 to B10).

The creating process of the NAS-dedicated volume 502 is performed by selecting the create button 805 in a state where "NAS" is selected as an attribute in the input area 804 in the volume creation screen 800 illustrated in FIG. 6.

In Step B1, various types of information input to the volume creation screen 800 are analyzed in the SAN OS 400, and the creating process of the SAN volume is performed based on the information in Step B2. In Step B3, the created SAN volume is formatted.

Thereafter, in Step B4, a process of changing the attribute of the created SAN volume to the NAS volume is performed, the information (for example, attribute information, size, and the like) of the created volume is stored in a database of configuration information in the SSD 107.

In Step B6, inter-GOS communication interface conversion control is performed, a volume number of the volume created in Step B2 is informed to the NAS OS 300 along with an instruction to create the NAS volume through the shared memory 520 by the inter-GOS communication.

In the NAS OS 300, first, a device is created based on the volume number according to the instruction to create the NAS volume informed by the inter-GOS communication in Step B7, and the device is registered (/dev). Therefore, the volume created in the SAN is recognized as hardware usable for the NAS OS 300.

Further, a partition is created for the created volume in Step B8, a mount point is created in Step B9, and the file system is formatted in Step B10.

Thereafter, the completion is informed to the SAN OS 400, completion/return of the screen is performed in the SAN OS 400 (Step B11), and the process is ended.

Figure 9:
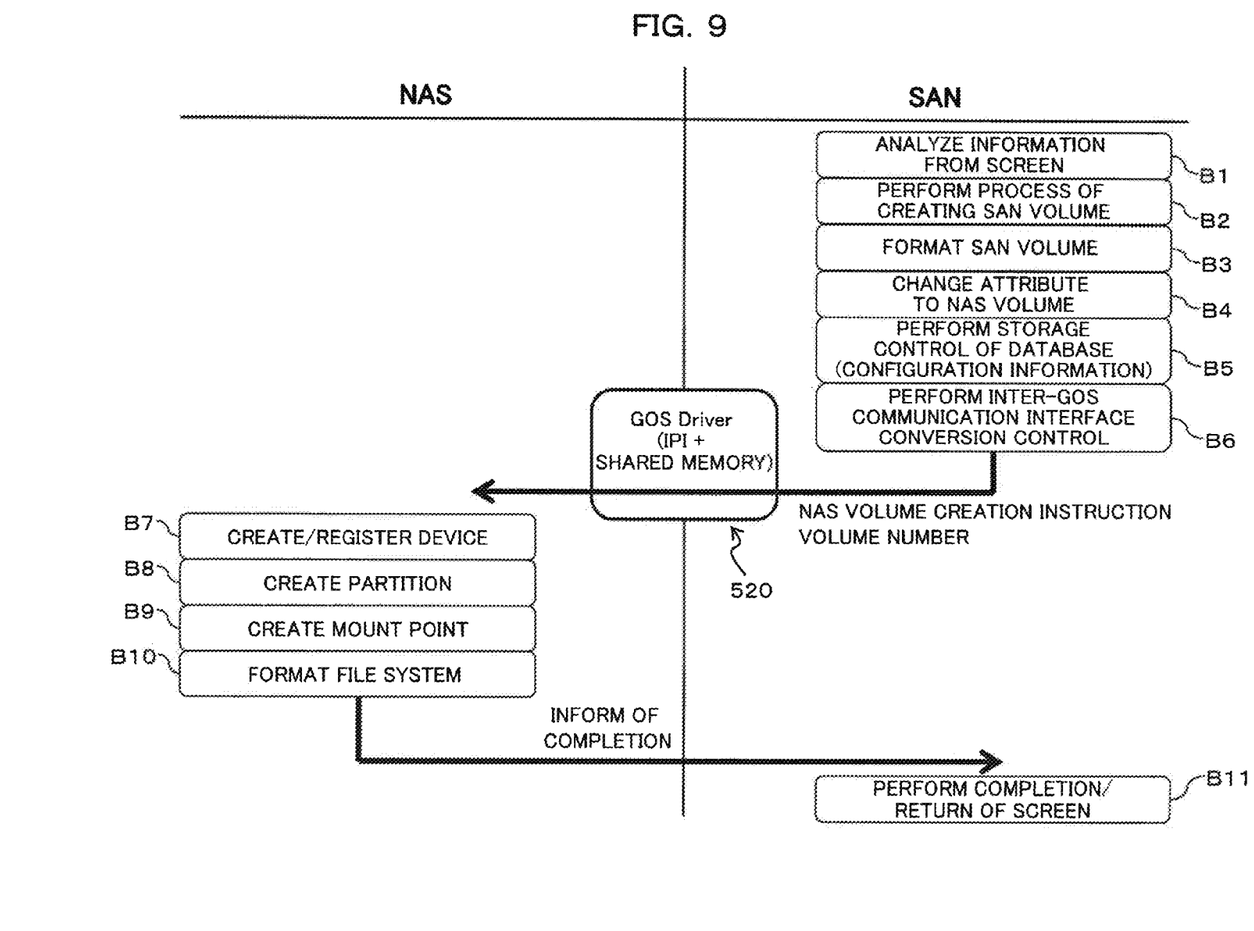
FIG. 9 is a sequence diagram for describing a creating process of a NAS-dedicated volume in the storage apparatus according to the embodiment.

In addition, the example illustrated in FIG. 9 illustrates a case where a process request input in the volume creation screen 800 is processed in the SAN OS 400 and transferred to the NAS OS 300 through the inter-GOS communication unit 500 to be processed in the NAS OS 300, but the invention is not limited thereto.

In other words, the process request input in the input screen, through which the process request of the NAS and the process request of the SAN can be input, may be processed in the NAS OS 300, and then transferred to the SAN OS 400 through the inter-GOS communication unit 500 to be processed in the SAN OS 400, and may be processed in various modified manners.

As described above, with the storage apparatus 1 according to the embodiment, the hypervisor 200 which is the virtualized OS is executed on the CPU 110 which is the multi-core processor, and the NAS OS 300 and the SAN OS 400 are executed on the hypervisor 200. Therefore, the file system control implemented in a dedicated server apparatus in the related art can be mounted in the storage apparatus 1 as the guest OS. Accordingly, it is possible to reduce a cost for introducing the server apparatus.

In the NAS OS 300, when receiving the I/O request of the NAS from the host apparatus and the like, the intelligent SCSI driver 311 suppresses the direct access to the SAN-dedicated volume 501 and transmits the I/O request of the NAS to the SAN OS 400 by the inter-guest OS communication through the inter-GOS communication unit 500.

At this time, since the inter-guest OS communication is performed by the direct interrupt scheme without passing through the hypervisor 200, it is possible to reduce time necessary for the communication.

In the SAN OS 400, the intelligent CA driver 420 performs the I/O request of the NAS and transmission/reception of a response with respect to the NAS OS 300. Thereafter, in the NAS agent 441 of the SAN OS 400, the NAS control block 441b controls the received I/O request, and the CA control block 441a processes the I/O request. In this way, the I/O request of the NAS can be processed in the SAN OS 400, and the NAS and the SAN can be integrally handled.

A response such as the processing result of the I/O request is transmitted from the intelligent CA driver 420 to the intelligent SCSI driver 311 of the NAS OS 300 through the inter-GOS communication unit 500. The NAS OS 300 transmits the response to the host apparatus.

In other words, the I/O requests of the NAS and the SAN are performed for the storage apparatus 1 without a special change in the functional configuration of the host apparatus, and the processing result can be received.

The NAS OS 300 and the SAN OS 400 are configured to be executed on the hypervisor 200, and the operation of the NAS and the operation of the SAN are configured to be input using the same menu screen. Further, at this time, the data transmission/reception between the SAN OS 400 and the NAS OS is performed by the inter-GOS communication unit 500. With this configuration, the NAS OS 300 and the SAN OS 400 can be operated by an integrated user interface, so that the convenience increases and a workload of a system operation manager is reduced. In other words, both the SAN and the NAS can be integrally designed/managed/maintained using a common user interface screen, so that the convenience increases.

In addition, the disclosed technology is not limited to the above embodiment, and various modifications can be made in a scope not departing from the spirit of the embodiment. The respective configurations and processes of the embodiment can be optionally selected as needed, or can be appropriately combined to each other.

For example, the above-mentioned embodiment illustrates an example in which VxWorks is used as the SAN OS 400 and Linux is used as the NAS OS 300, but the invention is not limited thereto and various modifications such as using other OSs can be made.

According to the embodiment, the NAS and the SAN can be efficiently integrated in the storage apparatus.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage control apparatus comprising:
    a processing unit that functions a SAN operating system which performs SAN control and a NAS operating system which performs NAS control to be operated on a virtualized operating system;
    an inter-OS communication unit that transmits and receives data between the NAS operating system and the SAN operating system;
    a transmission controller that transmits a NAS input/output request received in the NAS operating system to the SAN operating system through the inter-OS communication unit; and
    a NAS request processing unit that processes the NAS input/output request received from the transmission controller in the SAN operating system.

2. The storage control apparatus according to claim 1, wherein
    the SAN operating system includes
    a response controller that transmits a response to the NAS input/output request, which is processed by the NAS request processing unit, to the NAS operating system through the inter-OS communication unit.

3. The storage control apparatus according to claim 1, wherein
    the inter-OS communication unit includes
    a shared memory shared between the NAS operating system and the SAN operating system, and
    a notification unit that informs the SAN operating system or the NAS operating system at a data transmitting destination of an interrupt after the data is written in the shared memory.

4. The storage control apparatus according to claim 1, wherein
    a process request input in an input screen through which a process request of the NAS operating system and a process request of the SAN operating system are acceptable is processed in the SAN operating system or the NAS operating system, and
    the result of the process is transmitted to the NAS operating system or the SAN operating system through the inter-OS communication unit.

5. A storage control method comprising:
    functioning a SAN operating system which performs SAN control and a NAS operating system which performs NAS control to be operated on a virtualized operating system;
    transmitting a NAS input/output request which is received in the NAS operating system to the SAN operating system through inter-OS communication; and
    processing the NAS input/output request which is received in the SAN operating system.

6. The storage control method according to claim 5, wherein
    in the SAN operating system,
    a response to the processed NAS input/output request is transmitted to the NAS operating system through the inter-OS communication.

7. The storage control method according to claim 5, wherein
    in the inter-OS communication,
    data is written in a shared memory shared between the NAS operating system and the SAN operating system, and
    an interrupt is informed to the SAN operating system or the NAS operating system at a data transmitting destination.

8. The storage control method according to claim 5, wherein
    a process request input in an input screen through which a process request of the NAS operating system and a process request of the SAN operating system are acceptable is processed in the SAN operating system or the NAS operating system, and
    the result of the process is transmitted to the NAS operating system or the SAN operating system through the inter-OS communication.

9. A non-transitory computer-readable recording medium having stored therein a storage control program, wherein
    the program causes a computer to perform
    functioning a SAN operating system which performs SAN control and a NAS operating system which performs NAS control to be operated on a virtualized operating system,
    transmitting a NAS input/output request which is received in the NAS operating system to the SAN operating system through inter-OS communication; and
    processing the NAS input/output request which is received in the SAN operating system.

10. The non-transitory computer-readable recording medium having stored therein the storage control program according to claim 9, wherein
    in the SAN operating system,
    a response to the processed NAS input/output request is transmitted to the NAS operating system through the inter-OS communication.

11. The non-transitory computer-readable recording medium having stored therein the storage control program according to claim 9, wherein
    in the inter-OS communication,
    data is written in a shared memory shared between the NAS operating system and the SAN operating system, and an interrupt is informed to the SAN operating system or the NAS operating system at a data transmitting destination.

12. The non-transitory computer-readable recording medium having stored therein the storage control program according to claim 9, wherein
a process request input in an input screen through which a process request of the NAS operating system and a process request of the SAN operating system are acceptable is processed in the SAN operating system or the NAS operating system, and
the result of the process is transmitted to the NAS operating system or the SAN operating system through the inter-OS communication.

* * * * *